United States Patent [19]

Tsujii et al.

[11] Patent Number: 5,023,423

[45] Date of Patent: Jun. 11, 1991

[54] TRANSFORMER APPARATUS WITH RECTIFIERS

[75] Inventors: Gen Tsujii; Toshihiro Murakawa, both of Sayama, Japan

[73] Assignee: Honda Giken Kogyo Kabushiki Kaisha, Tokyo, Japan

[21] Appl. No.: 457,500

[22] Filed: Dec. 27, 1989

[30] Foreign Application Priority Data

Dec. 27, 1988 [JP] Japan ................................ 63-335314
Apr. 19, 1989 [JP] Japan ................................ 1-99766

[51] Int. Cl.[5] ............................................ B23K 11/24

[52] U.S. Cl. .................................... 219/108; 219/116; 363/126

[58] Field of Search ................ 219/108, 116; 363/125, 363/126

[56] References Cited

U.S. PATENT DOCUMENTS

| | | | |
|---|---|---|---|
| 3,460,022 | 8/1969 | Riley | 219/116 |
| 3,495,067 | 2/1970 | Sciaky | 219/116 |
| 3,840,720 | 10/1974 | Wolf | 219/116 |
| 4,571,669 | 2/1986 | Tsujii et al. | 219/116 |
| 4,682,000 | 7/1987 | Holt et al. | 219/116 |
| 4,750,101 | 7/1988 | Morita . | |

*Primary Examiner*—Clifford C. Shaw

[57] ABSTRACT

A transformer apparatus for use with a welding gun includes four transformer/rectifier assemblies each including a transformer having a secondary winding and a rectifier, a terminal plate connected to the secondary winding through the rectifier, and a center tap terminal plate connected to an intermediate portion of the secondary winding. The terminal plate and the center tap terminal plate are disposed on one side of the transformer, and the transformers of the transformer/rectifier assemblies are disposed side by side. The terminal plates of the transformer/rectifier assemblies are disposed closely to each other in confronting relation. First and second conductive bodies interconnect the terminal plates and the center tap terminal plates of the transformer/rectifier assemblies. The transformer/rectifier assemblies are symmetrically disposed.

6 Claims, 9 Drawing Sheets

TRANSFORMER APPARATUS WITH RECTIFIERS

BACKGROUND OF THE INVENTION

The present invention relates to a transformer apparatus with rectifiers, and more particularly to a transformer apparatus comprising two or more transformers which have terminal plates connected through rectifiers to the opposite ends of the secondary windings thereof and center tap terminal plates extending from intermediate portions of the secondary windings.

There has been known a transformer apparatus having a pair of terminal plates connected through rectifiers to the opposite ends of the secondary winding of a transformer. The transformer apparatus of this design is mostly incorporated in a resistance welding system. More specifically, the first terminal plate is disposed on one side of the transformer and the second terminal plate is disposed on the other side of the transformer. These terminal plates are coupled to ends of first and second conductive bodies, respectively, the other ends of which are connected to the welding gun of the resistance welding system.

A resistance welding apparatus of the inverter type includes switching devices, such as power transistors, on the primary side. Because of the capacity of these power transistors or the capacity of diodes on the secondary side, there is a certain limitation on a welding current that can be supplied to the welding gun. In some applications which require a relatively large welding current to weld thick plates or plated steel plates, for example, it is desirable to connect a plurality of transformers for a higher welding current capacity.

To meet such a demand with the known transformer apparatus, the first terminal plates of the connected transformers have to be connected together at one end of the first conductive body, and the second terminal plates of the connected transformers have to be connected together at one end of the second conductive body, with the other ends of the first and second conductive bodies extending closely to each other and being connected to the welding gun. With this arrangement, however, the first and second conductive bodies project out of the transformers, and the transformers are spaced a distance which is required to connect the terminal plates to the first and second conductive bodies. As a result, the transformer apparatus is large and heavy as a whole. Therefore, the resistance welding apparatus incorporating the transformer apparatus is also large and heavy. It is difficult to install the large and heavy resistance welding apparatus on the arm of a robot or the like for an automated welding operation.

Since the first and second conductive bodies to which the first and second terminal plates are connected are considerably long, they cause a substantial electric power loss which makes it impossible to supply a large electric current efficiently to the welding gun.

SUMMARY OF THE INVENTION

It is an object of the present invention to provide a transformer apparatus which is smaller and lighter and can minimize an electric power loss to supply a welding current efficiently.

Another object of the present invention is to provide a transformer apparatus comprising at least first and second transformer/rectifier assemblies each comprising a transformer including a secondary winding and a rectifier, a terminal plate connected to the secondary winding through the rectifier, a center tap terminal plate connected to an intermediate portion of the secondary winding, the terminal plate and the center tap terminal plate being disposed on one side of the transformer, the transformers of the first and second transformer/rectifier assemblies being disposed side by side, the terminal plates of the first and second transformer/rectifier assemblies being disposed closely to each other in a confronting relation, and first and second conducive bodies interconnecting the terminal plates and the center tap terminal plates of the first and second transformer/rectifier assemblies.

Still another object of the present invention is to provide a transformer apparatus wherein the first and second transformer/rectifier assemblies are symmetrically disposed.

Yet another object of the present invention is to provide a transformer further including third and fourth transformer/rectifier assemblies each comprising a transformer including a secondary winding, a rectifier, a terminal plate connected to the secondary winding through the rectifier, and a center tap terminal plate connected to an intermediate portion of the secondary winding, the terminal plate and the center tap terminal plate being disposed on one side of the transformer, the terminal plates and the center tap terminal plates of the first and second transformer/rectifier assemblies being connected to ends of the first and second conductive bodies, the terminal plates and the center tap terminal plates of the third and fourth transformer/rectifier assemblies being connected to the other ends of the first and second conductive bodies.

Yet still another object of the present invention is to provide a transformer further including a welding gun connected to the first and second conductive bodies.

A further object of the present invention is to provide a transformer apparatus comprising at east two transformer/rectifier assemblies each comprising a transformer including a secondary winding and a rectifier, a terminal plate connected to the secondary winding through the rectifier, and a center tap terminal plate connected to an intermediate portion of the secondary winding, the terminal plate and the center tap terminal plate having attachments for connecting the terminal plate and the center tap terminal plate to a welding gun.

A still further object of the present invention is to provide a transformer wherein the terminal plate and the center tap terminal plate have connectors connected to the secondary coils of the transformer/rectifier assemblies, the attachments of the terminal plate and the center tap terminal plate being equally spaced from the connectors.

A yet further object of the present invention is to provide a transformer wherein the terminal plate has slits defined therein so that the terminal plate is flexible.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
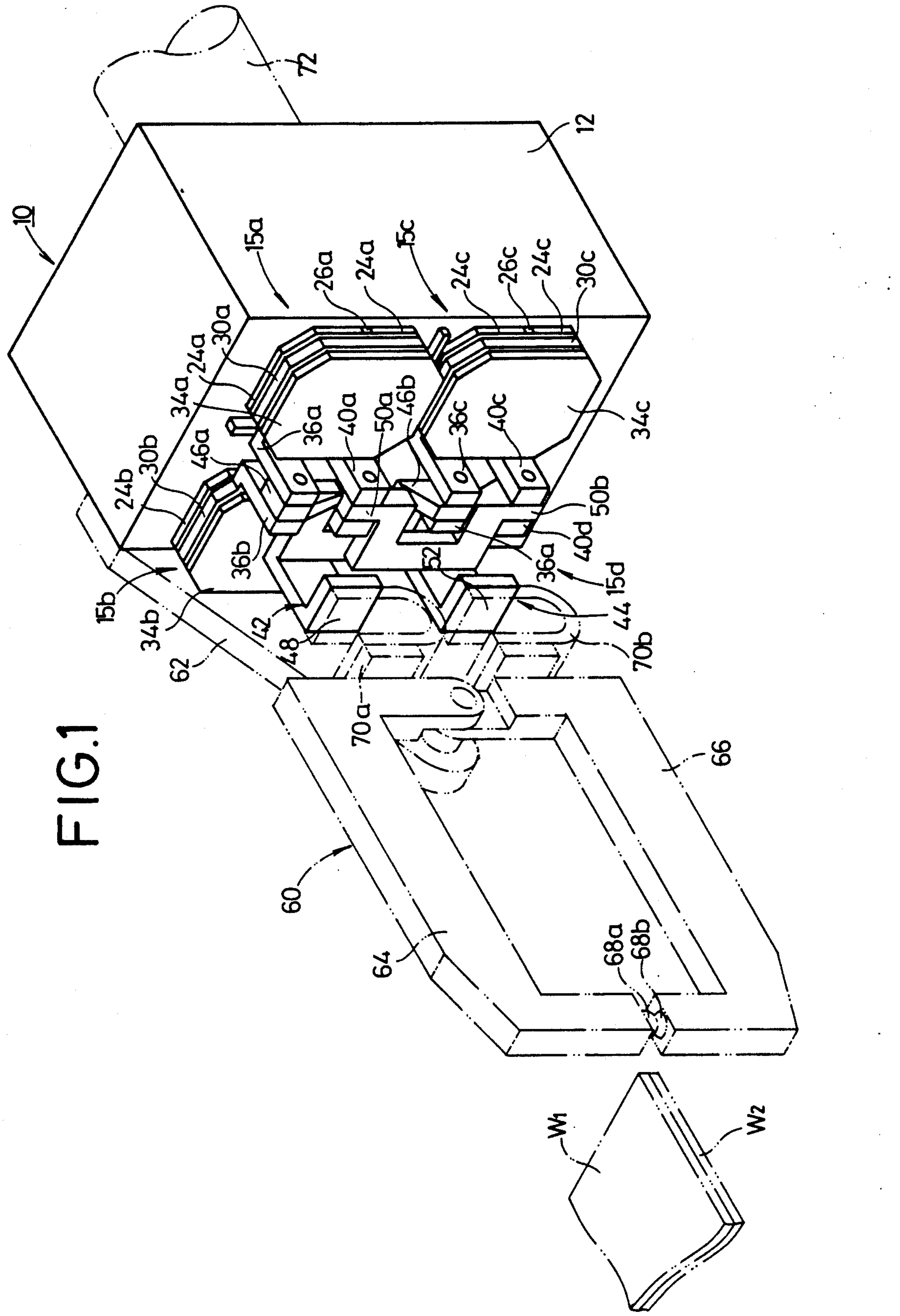
FIG. 1 is a perspective view of a transformer apparatus with rectifiers according to a first embodiment of the present invention, the view also showing a welding gun installed on the transformer apparatus.
Figure 2:
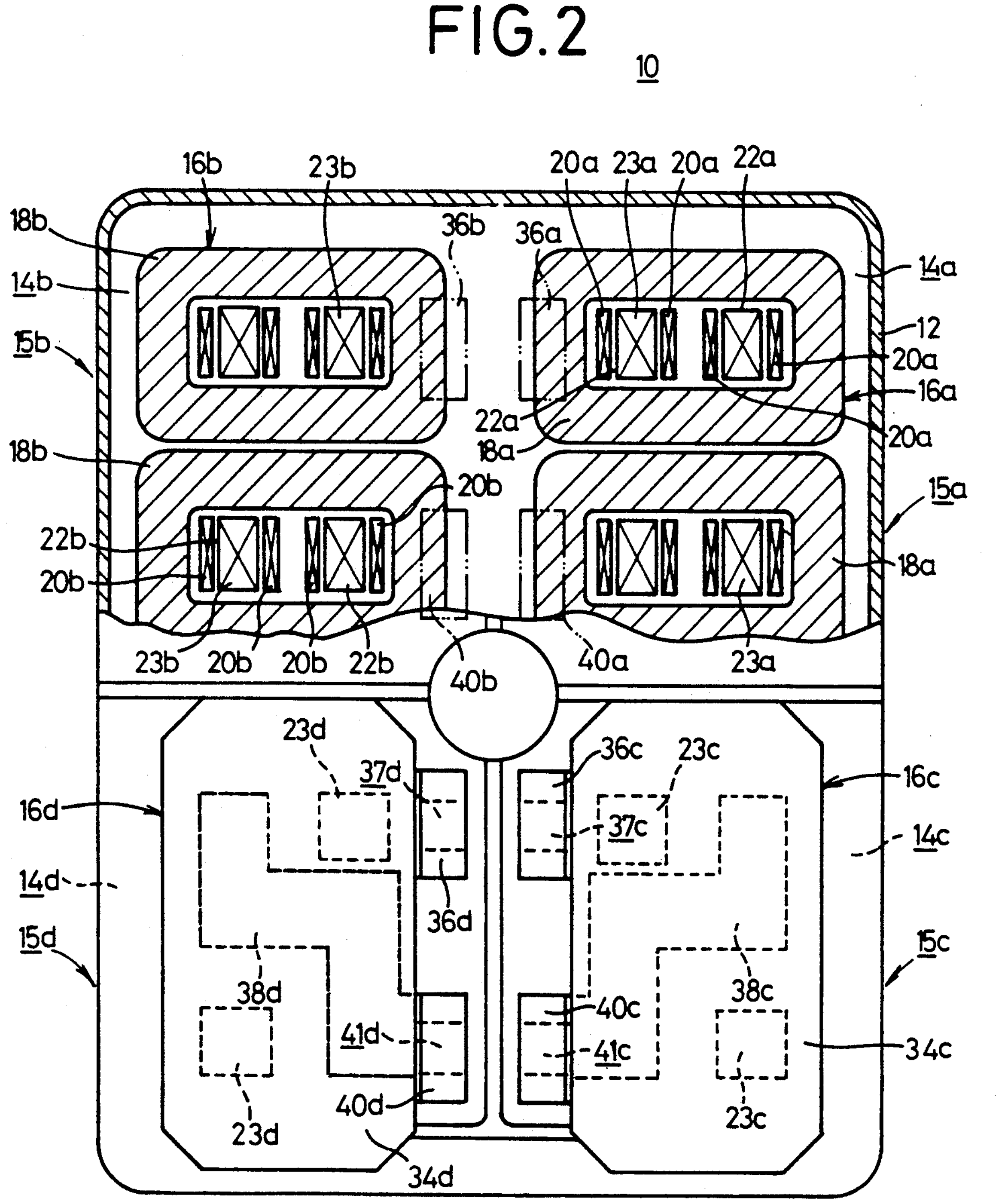
FIG. 2 is a front elevational view, partly in cross section, of the transformer apparatus.
Figure 3:
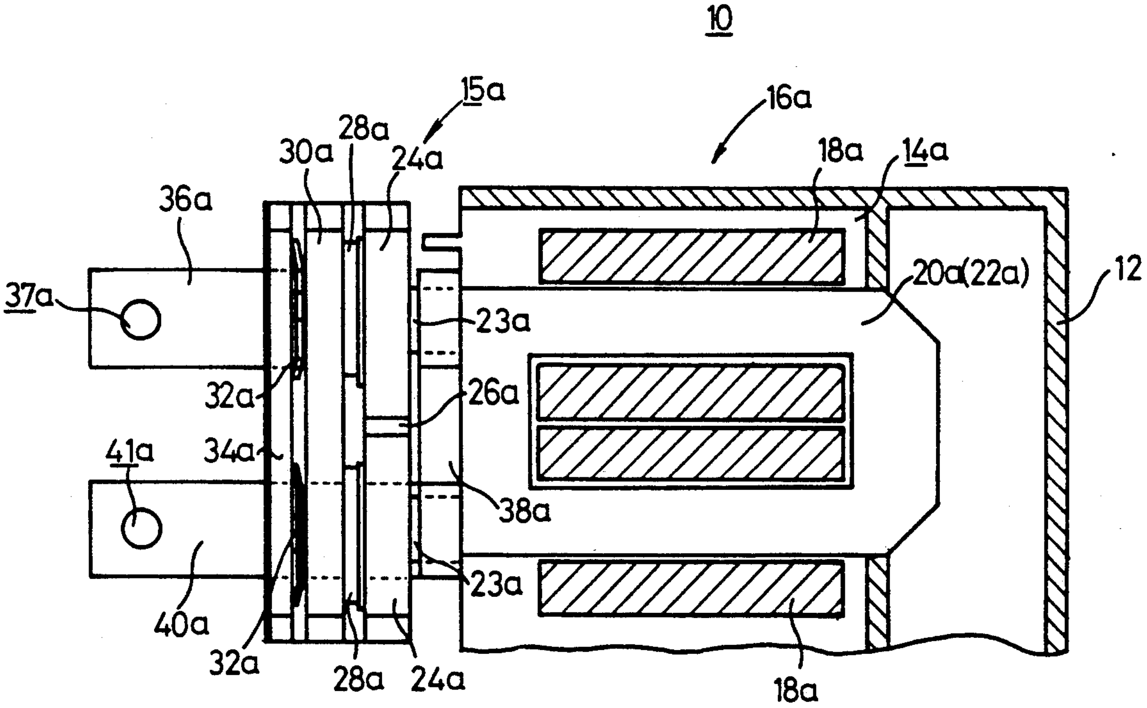
FIG. 3 is a fragmentary side elevational view, partly in cross section, of the transformer apparatus.

As shown in FIGS. 1 through 3, a transformer apparatus 10 with rectifiers according to a first embodiment of the present invention has a casing 12 of aluminum or the like defining four chambers 14*a* through 14*d* therein. The chambers 14*a* through 14*d* accommodate transformers 16*a* through 16*d*, respectively, of transformer/rectifier assemblies 15*a* through 15*d*.

The transformer/rectifier assembly 15*a* is constructed as follows:

The transformer 16*a* includes a pair of upper and lower cores 18*a* each in the shape of a hollow rectangular parallelepiped. The upper and lower cores 18 accommodate a pair of secondary windings 22*a* each sandwiched between primary windings 20*a*. The primary windings 20*a* are connected to an AC power supply (not shown). Each of the secondary windings 22*a* has opposite ends 23*a*, i.e., starting and terminal ends, integrally connected to upper and lower secondary electrode plates 24*a* with an insulating member 26*a* disposed therebetween. Therefore, two winding ends 23*a* are connected to the upper secondary electrode plate 24*a*, and two winding ends 23*a* are connected to the lower secondary electrode plate 24*a*.

A terminal plate 30*a* is placed on rectifiers 28*a* which are held against the secondary electrode plates 24*a* remotely from the ends 23*a* of the secondary windings 22*a*. Disc springs 32*a* are disposed on the terminal plate 30*a* remotely from and in alignment with the rectifiers 28*a*, and an iron plate 34*a* is held against the disc springs 32*a*. The plate 34*a*, the terminal plate 30*a*, and the secondary electrode plates 24*a* are fastened together by bolts (not shown). The terminal plate 30*a* has a bent end projecting laterally out of the transformer 16*a* as a first connector 36*a* having a through hole 37*a* defined therein.

A center tap terminal plate 38*a* extends integrally from intermediate portions of the secondary windings 22*a* and has a bent end projecting laterally out of the transformer 16*a* as a second connector 40*a* parallel to the first connector 36*a*, the second connector 40*a* having a through hole 41*a* defined therein. In the transformer 16*a*, the first connector 36*a* serves as a positive electrode, whereas the second connector 40*a*, serves as a negative electrode.

The other transformer/rectifier assemblies 15*b* through 15*d* are of the same construction as the transformer/rectifier assembly 15*a* described above. Those parts of the transformer/rectifier assemblies 15*b* through 15*d* which are identical to those of the transformer/rectifier assembly 15*a* are denoted by identical reference numerals with suffixes b, c, d, respectively, and will not be described in detail. The transformer/rectifier assemblies 15*a*, 15*b* are symmetrical in configuration and arranged side by side, and the transformer/rectifier assemblies 15*c*, 15*d* are also symmetrical in configuration and arranged side by side.

The first connectors 36*a*, 36*b* and the second connectors 40*a*, 40*b* of the transformer and rectifier combinations 15*a*, 15*b* are disposed closely and parallel to each other. Likewise, the first connectors 36*c*, 36*d* and the second connectors 40*c*, 40*d* of the transformer and rectifier combinations 15*c*, 15*d* are disposed closely and parallel to each other (see FIGS. 1 and 4).

Figure 4:
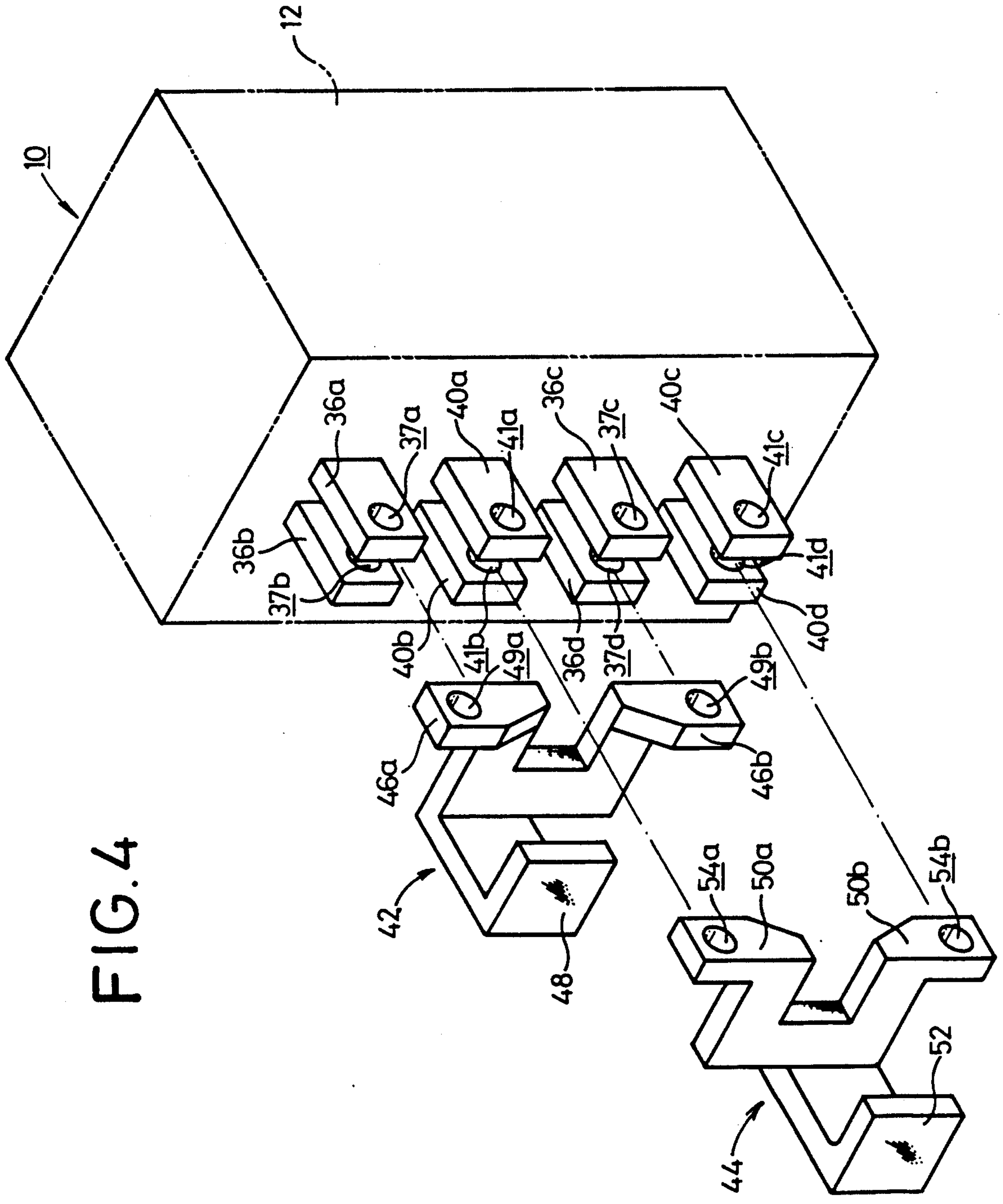
FIG. 4 is an exploded perspective view of the transformer apparatus.

A first conductive body 42 is joined to the first connectors 36*a* through 36*d* which serve as positive electrodes, and a second conductive body 44 is joined to the second connectors 40*a* through 40*d* which serve as negative electrodes. As shown in FIG. 4, the first conductive body 42 is of a bent configuration composed of planar segments and has on one end a pair of supports 46*a*, 46*b* fitted between and fixed to the first connectors 36*a*, 36*b* and the first connectors 36*c*, 36*d*, respectively. The first conductive body 42 also has on its opposite end an attachment 48 directed at about 90° with respect to the supports 46*a*, 46*b*. The supports 46*a*, 46*b* have respective through holes 49*a*, 49*b*. The first conductive body 42 is fastened to the transformer assembly 10 by a bolt (not shown) inserted through the holes 37*a*, 37*b* in the first connectors 36*a*, 36*b* and the hole 49*a* in the support 46*a* and a bolt (not shown) inserted through the holes 37*c*, 37*d* in the first connectors 36*c*, 36*d* and the hole 49*b* in the support 46*b*.

The second conductive body 44 is of the same bent shape as the first conductive body 42, and has supports 50*a*, 50*b* fitted between and fixed to the second connectors 40*a*, 40*b* and the second connectors 40*c*, 40*d* and an attachment 52 corresponding to the attachment 48. The supports 50*a*, 50*b* have respective through holes 54*a*, 54*b*. The second conductive body 44 is also fastened to the transformer assembly 10 in the same manner as the first conductive body 42.

As shown in FIG. 1, a welding gun 60 is installed on the transformer apparatus 10. The welding gun 60 includes a bracket 62 secured to the casing 12, a fixed gun arm 64 attached to the bracket 62, and a movable gun arm 66 angularly movably supported on the bracket 62 and swingable with respect to the fixed gun arm 64 by a suitable opening/closing means such as a cylinder. The fixed and movable gun arms 64, 66 support respective electrodes 68*a*, 68*b* on confronting ends thereof. The fixed gun arm 64 and the attachment 48 of the first conductive body 42 are connected to the opposite ends of a multilayer copper web 70*a*, and the movable gun arm 66 and the attachment 52 of the second conductive body 44 are similarly connected to the opposite ends, respectively, of a multilayer copper web 70*b*.

The transformer apparatus 10 to which the welding gun 60 is attached is mounted on the arm 72 of a robot (not shown).

Figure 5:
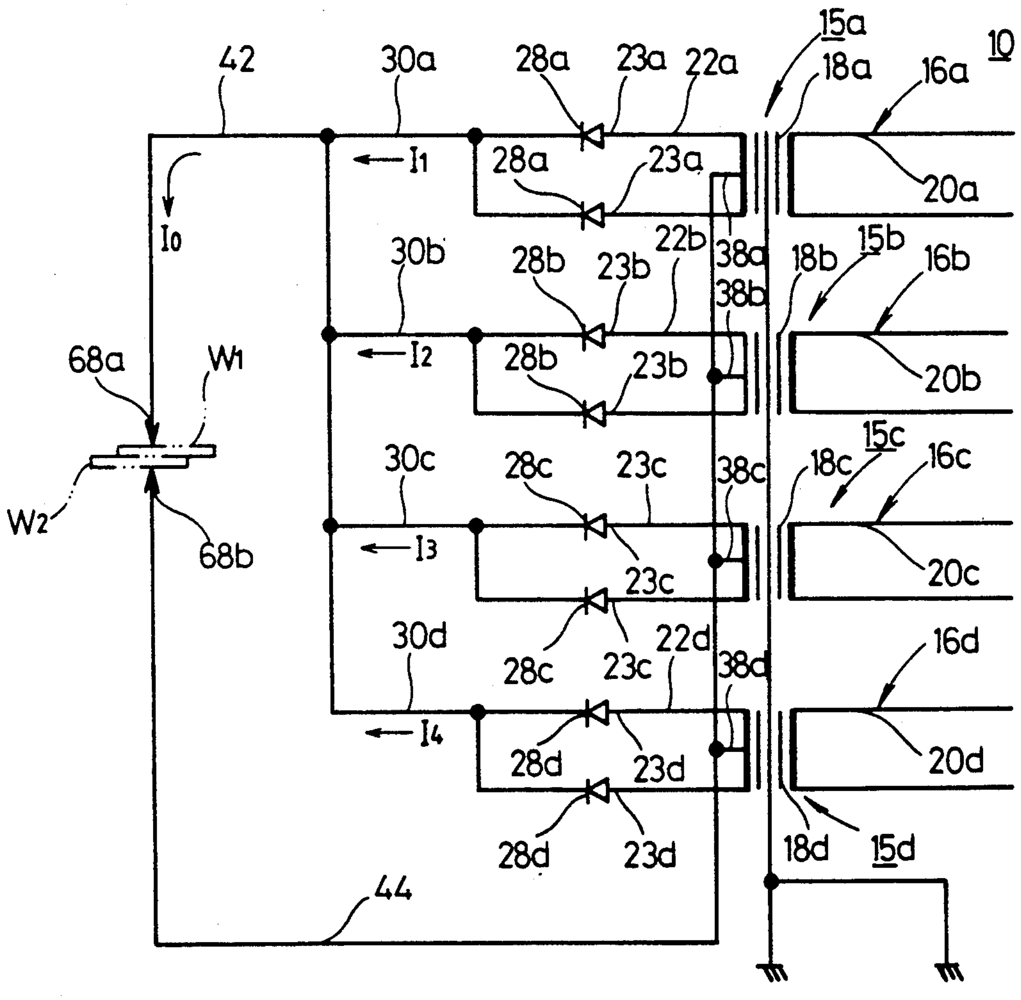
FIG. 5 is a circuit diagram of an electric circuit of the transformer apparatus.

The transformer apparatus 10 and the welding gun 60 make up an electric circuit as shown in FIG. 5.

The transformer apparatus 10 according to the first embodiment is basically constructed as described above. Operation and advantages of the transformer apparatus 10 will now be described in detail below.

Two workpieces $W_1$, $W_2$ are put together such that regions thereof to be welded to each other are superposed one on the other. The robot is actuated to cause the arm 72 to move the transformer apparatus 10 and the welding gun 60 toward the regions to be welded of the workpieces $W_1$, $W_2$. Then, the opening/closing means is operated to angularly move the movable gun arm 66 away from and toward the fixed gun arm 62 to grip the workpieces $W_1$, $W_2$ between the electrodes 68*a*, 68*b* on the gun arms 64, 66.

As shown in FIG. 5, a high-frequency alternating current which is produced by the non-illustrated AC power supply is transmitted from the primary windings 20*a* through 20*d* of the transformers 16*a* through 16*d* to the secondary windings 22*a* through 22*d* thereof. The alternating current is then rectified in a single-phase full-wave rectification mode by the rectifiers 28*a* through 28*d* connected to the ends of the secondary windings 22*a* through 22*d*. Therefore, rectified currents I through I. flow from the connectors 36*a* through 36*d* of the terminal plates 30*a* through 30*d* to the first conductive body 42 which combines the supplied currents $I_1$ through $I_4$ into a welding current $I_0$. The welding current $I_0$ is supplied from the electrode 68*a* electrically connected through the fixed gun arm 64 to the attachment 48 of the first conductive body 42 to the electrode 68*b* electrically connected through the movable gun arm 66 and the second conductive body 44 to the center tap terminal plates 38*a* through 38*d*. The superposed regions of the workpieces $W_1$, $W_2$ are now fused and welded to each other.

With the first embodiment, the four transformer/rectifier assemblies 15*a* through 15*d* are disposed closely to each other, and the first and second conductive bodies 42, 44 are short, so that the transformer apparatus 10 is small and light as a whole.

More specifically, the first connector 36*a* of the terminal plate 30*a* connected through the rectifiers 28*a* to the opposite ends of the secondary windings 22*a*, and the second connector 40*a* of the center tap terminal plate 38*a* extending from the intermediate portions of the secondary windings 22*a* are positioned on one side of the transformer 16*a* of the transformer/rectifier assembly 15*a*. Similarly, the first connector 36*b* of the terminal plate 30*b* and the second connector 40*b* of the center tap terminal plate 38*b* are positioned on one side of the transformer 16*b* of the transformer/rectifier assembly 15*b*. The transformer/rectifier assemblies 15*a*, 15*b* are of a symmetrical configuration. With the transformer/rectifier assemblies 15*a*, 15*b* mounted in the casing 12 side by side, the first connectors 36*a*, 36*b* are disposed closely to each other in confronting relation, and the second connectors 40*a*, 40*b* are disposed closely to each other in confronting relation. The first connectors 36*a*, 36*b* and the second connectors 40*a*, 40*b* are spaced from each other by the distance corresponding to the thickness of the support 46*a* of the first conductive body 42 and the support 50*a* of the second conductive body 44. Thus, the transformer/rectifier assemblies 15*a*, 15*b* can be placed in a small space.

In the transformer/rectifier assemblies 15*c*, 15*d*, the first connectors 36*c*, 36*d* and the second connectors 40*c*, 40*d* are also spaced from each other by the distance corresponding to the thickness of the supports 46*b*, 50*b* of the first and second conductive bodies 42, 44. As a consequence, the four transformer/rectifier assemblies 15*a* through 15*d* can be placed in a small space, making the transformer apparatus 10 small in size.

Since the first connectors 36*a* through 36*d* and the second connectors 40*a* through 40*d* are positioned closely, the first and second conductive bodies 42, 44 are greatly reduced in overall length. As a result, the transformer apparatus 10 is light and small, and is not subject to a large electric power loss, so that it enables the welding gun 60 to weld the workpieces highly efficiently.

A transformer apparatus 100 with rectifiers according to a second embodiment of the present invention will be described below with reference to FIGS. 6 through 9.

Those components of the transformer apparatus 100 which are identical to those of the transformer apparatus 10 according to the first embodiment are denoted by identical reference numerals, and will not be described in detail.

Figure 7:
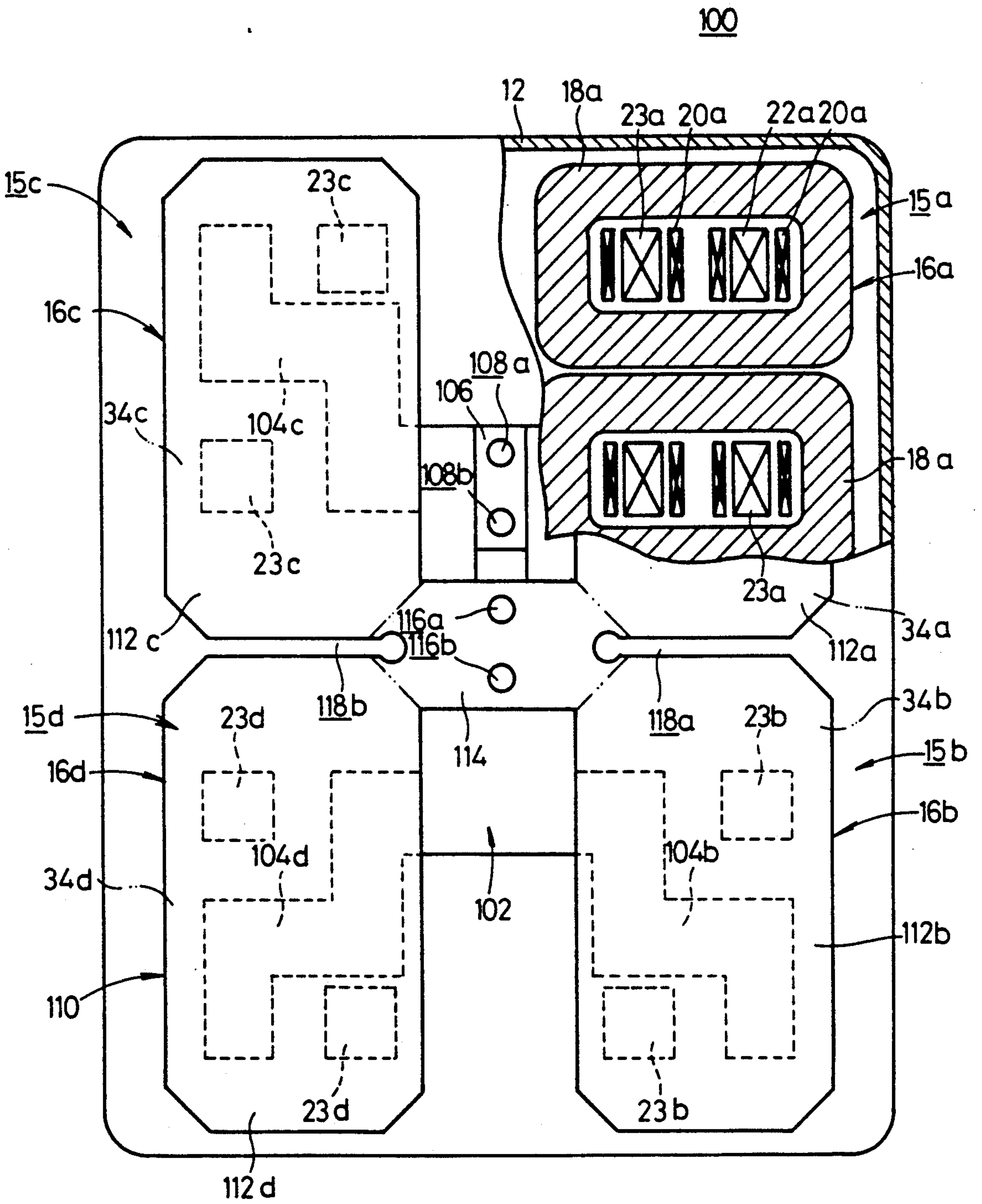
FIG. 7 is a front elevational view, partly in cross section, of the transformer apparatus.
Figure 8:
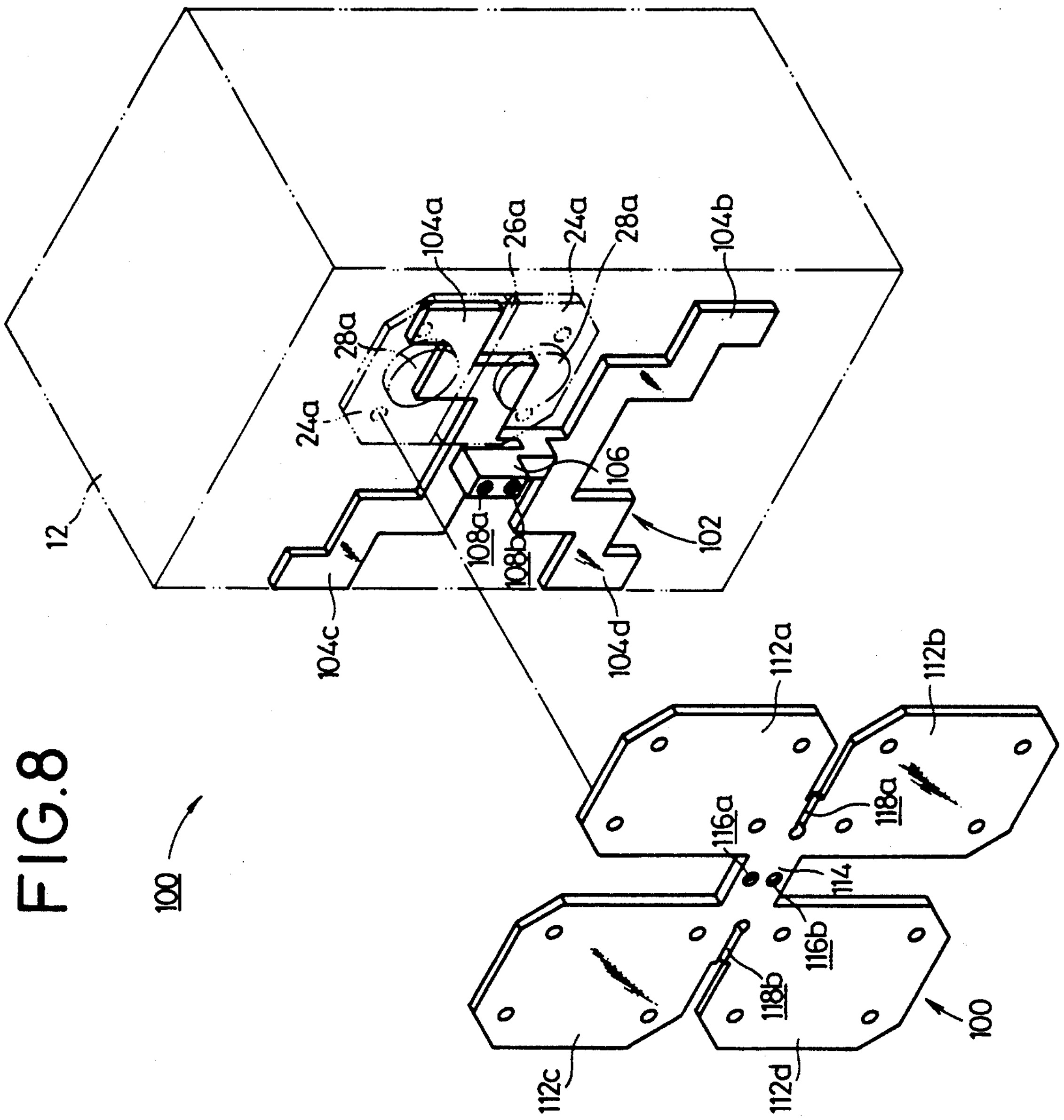
FIG. 8 is an exploded perspective view of the transformer apparatus.

As shown in FIGS. 7 and 8, a center tap terminal plate 102 which is fixed integrally to the transformers 16*a* through 16*d* is in the form of a plate and made of a conductive material. The center tap terminal plate 102 has connectors 104*a* through 104*d* extending radially outwardly from the center thereof. The connector 104*a* is of a zig-zag bent shape and secured to the intermediate portions of the secondary windings 22*a* of the transformer 16*a*. The other connectors are also of a zig-zag bent shape and secured to the intermediate portions of the secondary windings 22*b*, 22*c*, 22*d*, respectively. The center tap terminal plate 102 also has on its center an attachment 106 which is equally spaced from the radially outer connectors 104*a* through 104*d*. The attachment 106 extends in a direction perpendicular to the plane of the center tap terminal plate 102, and is bent upwardly (FIG. 8) at a right angle. The attachment 106 has threaded holes 108*a*, 108*b* defined in its outer end surface.

The pairs of rectifiers 28*a*, 28*b*, 28*c*, 28*d* are held against the pairs of secondary electrode plates 24*a*, 24*b*, 24*c*, 24*d*, respectively, and a terminal plate 110 is placed against the rectifiers 28*a*, 28*b*, 28*c*, 28*d*. The terminal plate 110 has rectangular connectors 112*a*, 112*b*, 112*c*, 112*d* extending radially outward from the center thereof, and an attachment 114 on the center. The attachment 114 has threaded holes 116*a*, 116*b* defined therein. Slits 118*a*, 118*b* are defined between the connectors 112*a*, 112*b* and between the connectors 112*c*, 112*d*.

Figure 6:
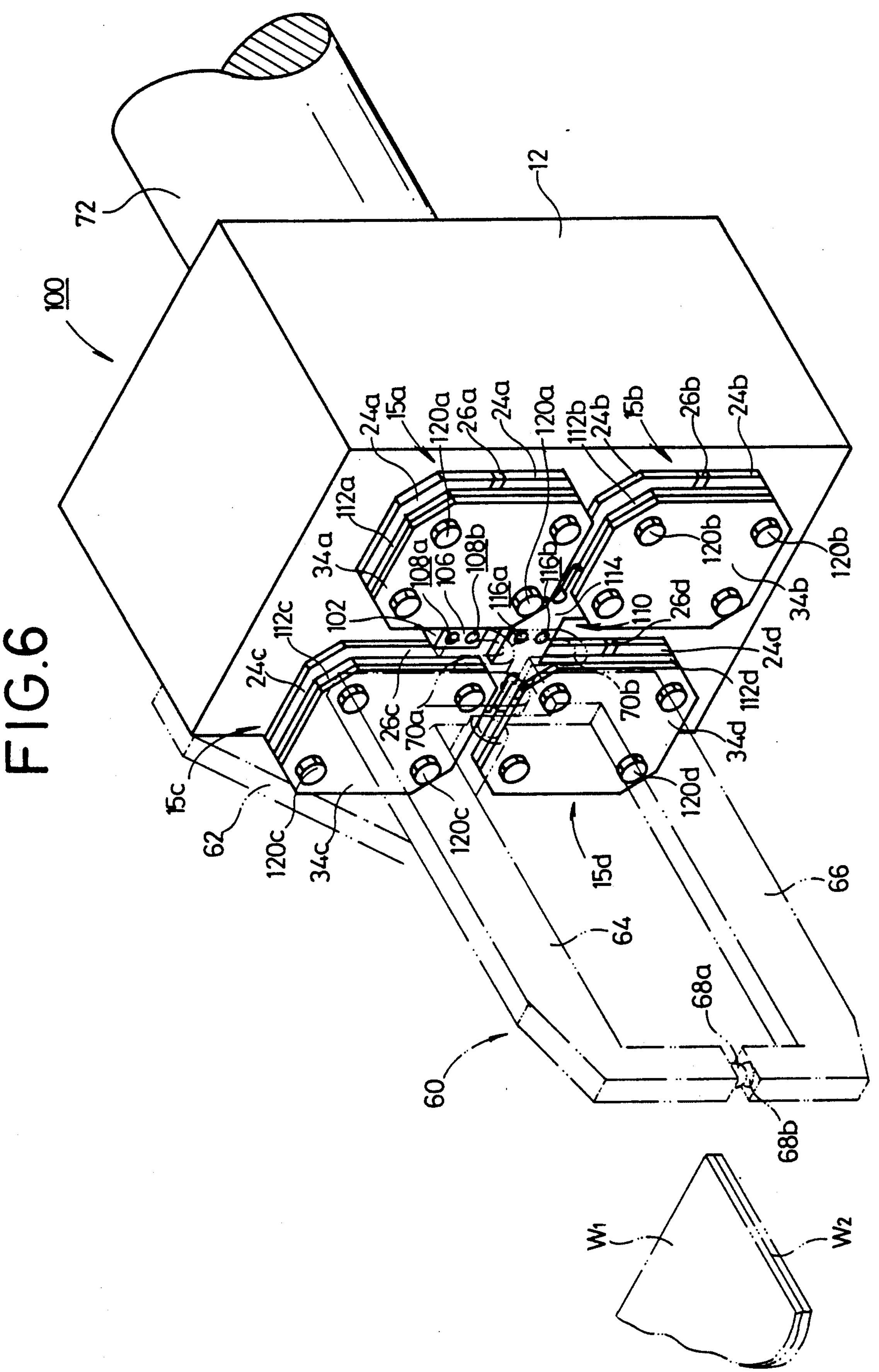
FIG. 6 is a perspective view of a transformer apparatus with rectifiers according to a second embodiment of the present invention, the view also showing a welding gun installed on the transformer apparatus.

Disc springs (not shown) are held against the connector 112*a* of the terminal plate 110 in alignment with the rectifiers 28*a*, respectively. The plate 34*a*, the connector 12*a*, and the secondary electrode plates 24*a* are fastened together by bolts 120*a* (FIG. 6). Likewise, the plates 34*b*, 34*c*, 34*d*, the connectors 112*b*, 112*c*, 112*d*, and the secondary electrode plates 24*b*, 24*c*, 24*d* are fastened together by bolts 120*b*, 120*c*, 120*d*, with the rectifiers and disc springs interposed therebetween. Since the terminal plate 110 has the slits 118*a*, 118*b*, the terminal plate 110 is relatively flexible to allow its connectors 112*a* through 112*d* to be fixed securely to the secondary electrode plates 24*a* through 24*d*.

The opposite ends of the multilayer copper web 70*a* are connected by bolts to the fixed gun arm 64 of the welding gun 60 and the attachment 106 of the center tap terminal plate 102. Likewise, the opposite ends of the multilayer copper web 70*b* are connected by bolts to the movable gun arm 66 and the attachment 114 of the terminal plate 110.

Figure 9:
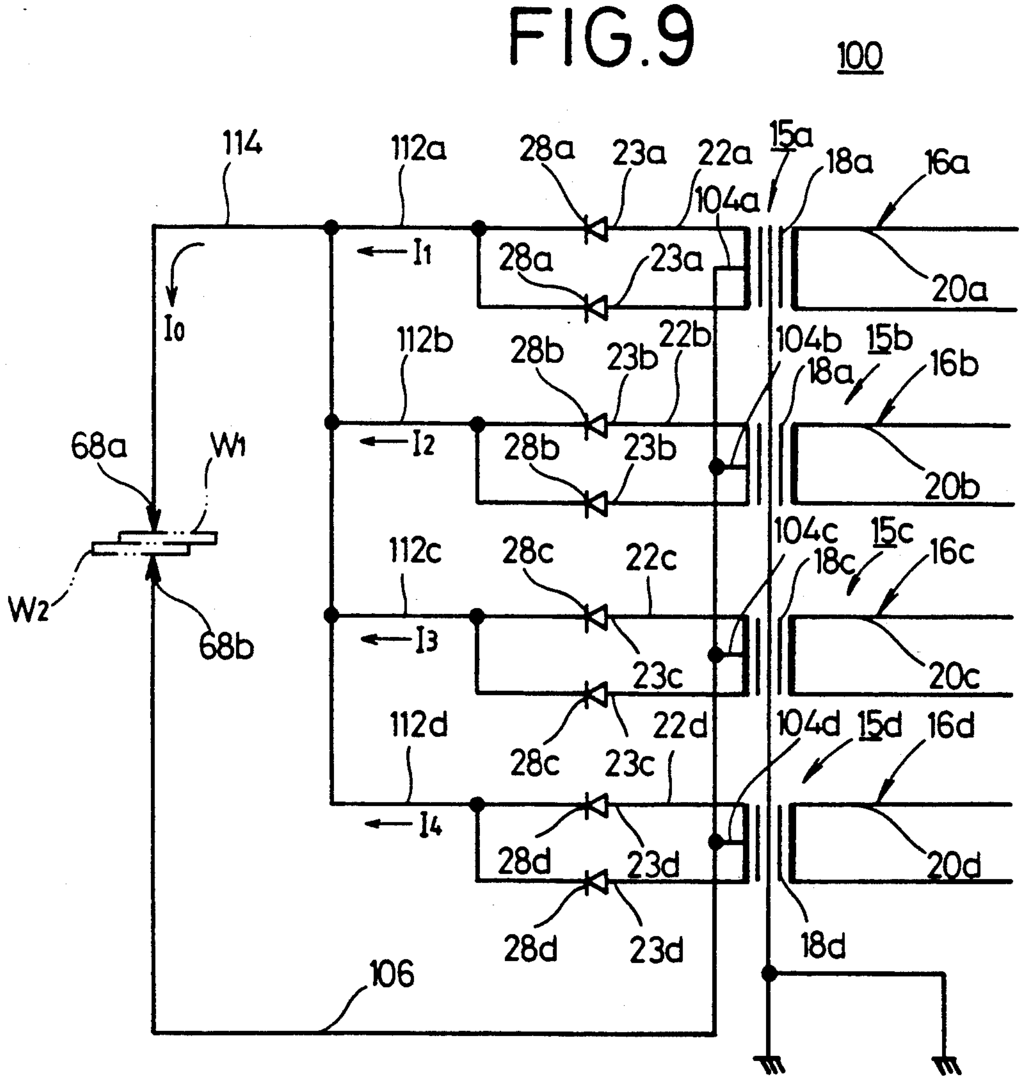
FIG. 9 is a circuit diagram of an electric circuit of the transformer apparatus.

FIG. 9 shows an electric circuit provided by the transformer apparatus 100 and the welding gun 60.

The transformer apparatus 100 according to the second embodiment operates in substantially the same manner as the transformer apparatus 10 according to the first embodiment. More specifically, as illustrated in FIG. 9, rectified currents $I_1$ through $I_4$ flow from the connectors 112*a* through 112*d* of the terminal plate 110 to the attachment 114 which combines the supplied currents $I_1$ through $I_4$ into a welding current $I_0$. The welding current $I_0$ is supplied from the electrode 68*a* electrically connected through the fixed gun arm 64 to the attachment 114 to the electrode 68*b* electrically connected through the movable gun arm 66 to the center tap terminal plate 102. Since the attachment 114 is positioned at the center of the terminal plate 110, the currents $I_1$ through $I_4$ rectified by the rectifiers 28*a* through 28*d* are accurately combined to produce the welding current $I_0$. The superposed regions of the workpieces $W_1$, $W_2$ are now fused and welded to each other.

With the second embodiment, the number of parts used in combination with the four transformer/rectifier assemblies 15*a* through 15*d* housed in the casing 12 is greatly reduced, making the transformer apparatus 100 smaller in size and minimizing any electric power loss caused by the transformer apparatus 100.

More specifically, the connectors 104*a* through 104*d* of the center tap terminal plate 102 are secured to the intermediate portions of the secondary windings 22*a* through 22*d* of the transformer/rectifier assemblies 15*a* through 15*d*, and the fixed gun arm 64 is directly coupled to the attachment 106 of the center tap terminal plate 102 through the multilayer copper web 70*a*. The connectors 112*a* through 112*d* of the terminal plate 110 are connected to the opposite ends of the secondary windings 22*a* through 22*d* through the rectifiers 28*a* through 28*d*, and the movable gun arm 66 is directly coupled to the attachment 114 of the terminal plate 110 through the multilayer copper web 70*b*.

Accordingly, the number of parts connected to the transformer/rectifier assemblies 15*a* through 15*d* is reduced, and no considerably long conductive bodies are required in connecting the transformer/rectifier assemblies 15*a* through 15*d*. The transformer apparatus 100 is therefore reduced in size and weight. Any electric power loss caused by the transformer apparatus 100 is greatly reduced, making it possible to enable the welding gun 60 to weld the workpieces efficiently.

The attachment 106 projecting from the center of the center tap terminal plate 102 allows the current to flow from the electrode 68*b* through the attachment 106 uniformly to the connectors 104*a* through 104*d*.

With the present invention, as described above, at least two transformer/rectifier assemblies are disposed closely to each other, so that the transformer apparatus is small in size. The conductive bodies which interconnect the terminal plates of the transformer/rectifier assemblies and the center tap terminal plates are reduced in length. As a result, the transformer apparatus is also small in weight, and the electric power loss caused thereby is considerably reduced.

Moreover, the number of parts used in combination with the transformer/rectifier assemblies is reduced, also reducing the weight of the transformer apparatus and the electric power loss caused thereby.

Although certain preferred embodiments have been shown and described, it should be understood that many changes and modifications may be made therein without departing from the scope of the appended claims.

What is claimed is:

1. A transformer apparatus comprising:

at least first and second transformer/rectifier assemblies each comprising respective first and second transformers including a secondary winding and a rectifier;

a first terminal plate connected to the secondary winding of said second transformer/rectifier assembly through said rectifier thereof;

a second terminal plate connected to the secondary winding of said second transformer/rectifier assembly through said rectifier thereof;

a first center tap terminal plate connected to an intermediate portion of the secondary winding of said first transformer/rectifier assembly, said first terminal plate and said first center tap terminal plate being disposed on one side of said first transformer;

a second center tap terminal plate connected to an intermediate portion of the secondary winding of said second transformer/rectifier assembly, said second terminal plate and said second center tap terminal plate being disposed on one side of said second transformer;

said first and second transformers being disposed side by side, and said first and second terminal plates being disposed closely to each other in confronting relation;

a first conductive body interconnecting said first and second terminal plates, and a second conductive body interconnecting said first and second center tap terminal plates;

third and fourth transformer/rectifier assemblies each comprising respective third and fourth transformers including a secondary winding and a rectifier;

a third terminal plate connected to the secondary winding to said third transformer/rectifier assembly through said rectifier thereof;

a fourth terminal plate connected to the secondary winding of said fourth transformer/rectifier assembly through said rectifier thereof;

a third center tap terminal plate connected to an intermediate portion of the secondary winding of said first transformer/rectifier assembly, said third terminal plate and said third center tap terminal plate being disposed on one side of said third transformer; and a fourth center tap terminal plate connected to an intermediate portion of the secondary winding of said fourth transformer/rectifier assembly, said fourth terminal plate and said fourth transformer, one end of said first conductive body interconnecting said first and second terminal plates, and another end of said first conductive body interconnecting said third and fourth terminal plates, one end of said second conductive body interconnecting said first and second center tap terminal plates, and another end of said second conductive body interconnecting said third and fourth center tap terminal plates, and wherein said first and second transformer/rectifier assemblies are symmetrically disposed.

2. A transformer apparatus according to claim 1, further including a welding gun connected to said first and second conductive bodies.

3. A transformer apparatus comprising:

at least first and second transformer/rectifier assemblies each comprising respective first and second transformers including a secondary winding and a rectifier;

a terminal plate having at least first and second radially disposed connector plates, said first connector plate connected to the secondary winding of said first transformer/rectifier assembly through said rectifier thereof, and said second connector plate being connected to the secondary winding of said second transformer/rectifier assembly through said rectifier thereof;

a center tap terminal plate having at least first and second radially disposed center tap connectors, said first center tap connector being connected to an intermediate portion of the secondary winding of said first transformer/rectifier assembly, and said second center tap connector being connected to an intermediate portion of the secondary winding of said second transformer/rectifier assembly;

said terminal plate and said center tap terminal plate having attachments for connecting said terminal plate and said center tap terminal plate to a welding gun.

4. A transformer apparatus according to claim 3, further including third and fourth transformer/rectifier assemblies each comprising respective third and fourth transformers including a secondary winding and rectifier;

said terminal plate further including third and fourth radially disposed connector plates, said third connector plate being connected to the secondary winding of said third transformer/rectifier assembly through said rectifier thereof, and said fourth connector plate being connected to the secondary winding of said fourth transformer/rectifier assembly through said rectifier thereof;

said center tap terminal plate including third and fourth radially disposed center tap connectors, said third center tap connector being connected to an intermediate portion of the secondary winding of said third transformer rectifier assembly, and said fourth center tap connection being connected to an intermediate portion of the secondary winding of said fourth transformer/rectifier assembly.

5. A transformer apparatus according to claim 3 or 4, wherein said attachments of said terminal plate and said center tap terminal plate are substantially equally spaced from said radially disposed connector plates and center tap connectors, respectively.

6. A transformer apparatus according to claim 3 or 4, wherein said terminal plate has slits defined therein between said radially disposed connector plates, so that the terminal plate is flexible.

* * * * *